United States Patent [19]

Simpson

[11] Patent Number: 4,824,939

[45] Date of Patent: Apr. 25, 1989

[54] PROCESS FOR LEACHING PARTICULATE SOLID MATERIALS

[75] Inventor: Brian L. Simpson, Hamlin, N.Y.

[73] Assignee: Eastman Kodak Company, Rochester, N.Y.

[21] Appl. No.: 917,342

[22] Filed: Oct. 9, 1986

[51] Int. Cl.$^4$ .................. A23J 1/10; B01D 11/02; C07G 7/00

[52] U.S. Cl. .................. 530/356; 530/422; 530/423; 530/426; 530/840; 204/233; 75/101 R; 266/101; 502/22

[58] Field of Search ........... 350/355, 356, 422, 423, 350/424, 425, 426, 840; 204/233; 75/101 R; 266/101; 502/22

[56] References Cited

U.S. PATENT DOCUMENTS

| | | | |
|---|---|---|---|
| 3,142,667 | 7/1964 | Grettie et al. | 530/355 |
| 3,445,448 | 5/1969 | McCann | 530/355 |
| 3,539,549 | 11/1970 | Greenfield | 530/419 |
| 4,294,753 | 10/1981 | Urist | 530/355 |
| 4,614,543 | 9/1986 | Duyvesteyn et al. | 75/101 R |

FOREIGN PATENT DOCUMENTS 1251616 10/1971 United Kingdom .

OTHER PUBLICATIONS

Svanoe, "Krystal Classifying Crystallizer", Ind. Eng. Chem., 32, 636 (1940).
Placho et al., "Counter-Current Solid Liquid Extraction/Cascade of Batch Extractors", The Canadian Jour. Chem. Eng., vol. 50, 611-615, Oct. 1972.
Agarwal et al., "Multistage-Leaching Simulation", Chem. Eng., 135-140, May 24, 1976.
Makarewicz et al., "Kinetics of Acid Diffusion and Demineralization of Bone", The Jour. Photographic Sci., vol. 28, 177 (1980).
H. G. Schwartzberg, "Continuous Countercurrent Extraction in the Food Industry", CEP 76, No. 4, pp. 67-85, 1980.

Primary Examiner—John Kight
Assistant Examiner—Nathan M. Nutter
Attorney, Agent, or Firm—Alfred P. Lorenzo

[57] ABSTRACT

A novel leaching process for separating extractable material from a particulate solid material that comprises extractable and non-extractable portions includes the steps of introducing the particulate solid material and a liquid solvent to an extraction zone; agitating the liquid solvent to a degree sufficient to suspend the particulate solid material and effect segregation of particles thereof in relation to their propensity to settle; maintaining contact between the liquid solvent and the particulate solid material for a time sufficient to leach extractable material therefrom; and selectively withdrawing particles of the solid material from the extraction zone. In a preferred embodiment, the leaching process is a multistage process in which the selectively withdrawn particles from each stage are introduced to the next successive stage of the series. A particularly important use for the novel leaching process is in the recovery of gelatin from bone, and specifically in that step of the gelatin manufacturing process in which granulated bone is demineralized by contact with a dilute acid solution which converts bone particles to particles of ossein by extracting the minerals from the bone.

24 Claims, 5 Drawing Sheets

PROCESS FOR LEACHING PARTICULATE SOLID MATERIALS

FIELD OF THE INVENTION

This invention relates in general to extraction processes and in particular to liquid/solid extraction processes typically referred to as leaching processes. More specifically, this invention relates to a novel high-efficiency leaching process applicable to the leaching of a wide variety of particulate solid materials comprised of extractable and non-extractable portions.

BACKGROUND OF THE INVENTION

The Process of liquid/solid extraction, also known as leaching, involves the transfer of a solute from a solid, generally employed in particulate form, to a liquid solvent which is termed the "extract". In this process, the solid imbibes the solvent which dissolves the solute and thereby extracts it from the solid. The process is very widely used especially in the food industry where it is employed in such diverse tasks as the leaching of cottonseed oil from cottonseed using hexane as the solvent, the leaching of caffeine from coffee beans sing methylene chloride as the solvent, the leaching of sucrose from sugar beets using water as the solvent, and the leaching of minerals from bone, using hydrochloric acid as the solvent. In some leaching processes, as for example in the leaching of minerals from bone, the solvent also serves as a chemical reactant. Thus, the hydrochloric acid reacts with the minerals present in bone to convert them to soluble salts and, accordingly, the leaching process in this instance is actually an extraction/reaction process.

Leaching is a very old process and a great diversity of apparatus has been developed over the years to meet the varying requirements of the process in respect to its widely diverse applications. Leaching processes have been proposed which operate in a batch, semi-batch or continuous mode, and both single-stage and multi-stage contacting techniques are used. Leaching equipment is commercially available for a wide variety of processes, including fixed-bed processes in which solvent is percolated through a stationary bed of solids, moving-bed processes in which the solids are conveyed through the solvent with little or no agitation, and dispersed-solid processes in which the solids are dispersed in the solvent by mechanical agitation.

Among the many critical problems involved in the successful operation of a leaching process are those associated with the fact that the solid material to be leached is often quite heterogeneous in character, and therefore exceedingly difficult to treat in an optimum manner. This problem is especially well illustrated by the difficulties encountered in processes currently used for demineralization of bone.

Cattle bone is one of the important raw materials for the manufacture of photographic gelatin, as well as several grades of food gelatin. Typically, the bone is ground, classified by size, cleaned of fats, grease, blood and bone marrow by hot water washing, and then demineralized in a liquid/solid extraction/reaction process, using dilute acid solution, usually hydrochloric acid, as the solvent/reactant. Removal of the minerals from the bone particles in the demineralization process yields particles of a material known as ossein, similar in size and shape to the original bone particles, which are further processed by means of various well-known steps, typically including a liming step, to produce gelatin. The demineralization is accomplished in large vats filled with the granulated bone to a depth of as much as two meters or more, and flooded with the acid solution so as to completely immerse the bone. The reaction proceeds throughout the settled bed of bone particles until the original acid charge is exhausted. Meanwhile, fresh acid is added at the top of the bed, the liquor containing dissolved acid salts is withdrawn at the bottom of the bed, and carbon dioxide evolves from the top of the bed. After a predetermined time of immersion, usually three to six days depending on the size of the bone particles, the acid liquors are drained. The bed, now composed of particles of ossein, is water washed to remove residual liquor and evacuated as an aqueous slurry.

The granulated cattle bone which serves as the starting material in the gelatin manufacturing process comprises particles of varying size—typically ranging from about 2 to about 30 millimeters in diameter—and of widely varying density—ranging from particles which are hard, non-porous and of high density to particles which are soft, porous and of low density. The problem of treating these heterogeneous particles in a manner which even approximates an optimum for each is clearly a formidably difficult one. The demineralization is essentially a diffusion-controlled process (see P. J. Makarewicz, L. Harasta and S. L. Webb, "Kinetics of Acid Diffusion and Demineralization of Bone". The Journal of Photographic Science, Vol. 28, 177 (1980)) so that larger bone particles require a proportionately longer time of exposure to the acid solution to effect complete demineralization than smaller particles. Similarily, hard non-porous particles require a longer time than soft porous particles. With respect to any given particle the time of contact with the acid solution can be too short—resulting in incomplete demineralization—or too long—resulting in degradation of the ossein and consequent low quality of the gelatin recovered therefrom. Thus, if the process is adjusted to provide an optimum time for large hard, non-porous particles, it will be far too long for small, soft, porous particles, and vice versa.

The actual time at which an individual particle of bone is completely acidulated, i.e., demineralized depends on its size its density, and its location in the bed. Although the bone particles are usually classified before treatment, there are still significant differences in particle diameters within a bone batch. Bone at the top of the bed is completely acidulated first, because it is closer to the fresh acid feed; whereas fresh acid cannot reach the bottom of the bed until the bulk of the bone through which it must percolate is completely acidulated. Dense bone contains more mineral and offers more resistance to acid diffusion within a particle. Therefore, dense bone can be expected to acidulate much more slowly than light bone. In addition, in a large settled bed there are likely to be channels through which acid will move preferentially; and there will be areas where acid flow is restricted by fines, or grease, or partially decomposed sinew. These areas, particularly if they are near the bottom of the bed, will take longer to demineralize than adjacent well-irrigated sectors. Ash residue within the ossein particle and minimally hydrolyzed ossein result from minimal exposure or underexposure to acid.

Ossein exposed to fresh acid is vulnerable to significant degradation by excessive acid hydrolysis. Demineralized particles which, for whatever reason, suffer longer exposure, especially at higher temperature, can expect to be found to have been hydrolyzed more completely. This ossein is more soluble and subject to loss or degradation to undesirably low molecular weight gelatin.

The settled bed, because of its compaction and the slow percolation rate of acid liquor, does not promote self-cleaning or flushing. Therefore, sinews, grease and fatty acids tend to remain with the ossein and must be removed by subsequent washing and separation or screening steps. Each of these additional steps results in some loss of ossein and/or extracted gelatin. In addition, the presence of these contaminants unless completely eliminated, potentially lowers the quality of the finished gelatin.

In summary the settled bed process now in use for acidulation of bone produces ossein which is not uniform with respect to degree of demineralization or degree of hydrolysis. Furthermore, the acidulation time necessary to completely acidulate a large bed is excessive for many of the particles therein. Non-uniformity in the acidulation step potentially results in loss of yield and variability in the molecular weight and quality of the gelatin produced.

The problems resulting from the heterogeneous character of cattle bone particles, which are described in some detail hereinabove, are representative of similar problems that occur in a host of other leaching processes in which the starting material is non-homogeneous. To date, a fully satisfactory solution to these problems has not been found, although attempts toward circumventing them to some degree have been proposed in a number of patents including British Pat. No. 1 251 616 and U.S. Pat. Nos. 3,142,667, 3,445,448, and 3,539,549.

It is toward the general objective of providing a novel high-efficiency leaching process, which is applicable to a wide variety of solid materials and which overcomes the aforesaid problems to a very substantial degree, that the present invention is directed. It is a more specific objective of the present invention to provide a novel process for demineralization of bone that facilitates the achievement of enhanced yield and improved quality in the gelatin manufacturing operation.

SUMMARY OF THE INVENTION

The present invention is a novel leaching process which is useful for leaching a particulate solid material that comprises extractable and nonextractable portions. The process includes the steps of introducing the particulate solid material and a liquid solvent to an extraction zone; agitating the liquid solvent to a degree sufficient to suspend the particulate solid material and effect segregation of particles thereof in relation to their propensity to settle; maintaining contact between the liquid solvent and the particulate solid material for a time sufficient to leach extractable material therefrom: and selectively withdrawing particles from the extraction zone. In a preferred embodiment, the leaching process is a multi-stage process employing a series of stages in which the selectively withdrawn particles from each stage are introduced to the next successive stage of the series.

The key to successful operation of the process of this invention is to maintain the particles in a state of suspension in the liquid solvent under conditions where they are able to segregate in relation to their propensity to settle. This is readily achieved by appropriate control of the level of agitation. Such segregation makes it an easy matter to then withdraw the particles on a selective basis. Application of this principle to the field of liquid/solid extraction is believed to be broadly novel, and provides important benefits in this art not easily achievable by any other means. For example, the need for mechanical devices which convey solid particles from stage to stage, as is typical in the prior art, and the resulting mechanical complexity and need for costly and time-consuming maintenance work, is entirely avoided. Moreover, since the solid particles are suspended in the liquid solvent, they are acted on in a uniform manner by a solution of substantially the same composition at all points with in an extraction stage.

While classifying crystallizers that maintain crystals in suspension by the upward flow of liquor have been known for many years (see, for example, Svanoe, Ind. Eng. Chem., 32, 636, 1940), the operation of such crystallizers does not involve the leaching of a particulate solid material.

When the extractable and non-extractable portions of the solid material differ in density, as is typically the case, then the extraction process brings about a change in buoyancy of the particles. Thus, when the extractable portion is denser than the non-extractable portion, the particles become more buoyant as the degree of extraction increases, whereas when the extractable portion is less dense than the non-extractable portion, they become less buoyant. In either instance, this change in buoyancy contributes to the segregation of the particles and the ability to effect the desired selective separation.

In a specific preferred embodiment of the invention, in which particularly advantageous benefits are achieved, the leaching process is applied to the leaching of minerals from bone particles so as to convert such particles to ossein in the first major step of the well-known process for producing gelatin from bone.

BRIEF DESCRIPTIONS OF THE DRAWINGS

DETAILED DESCRIPTION OF THE INVENTION

Figure 1:
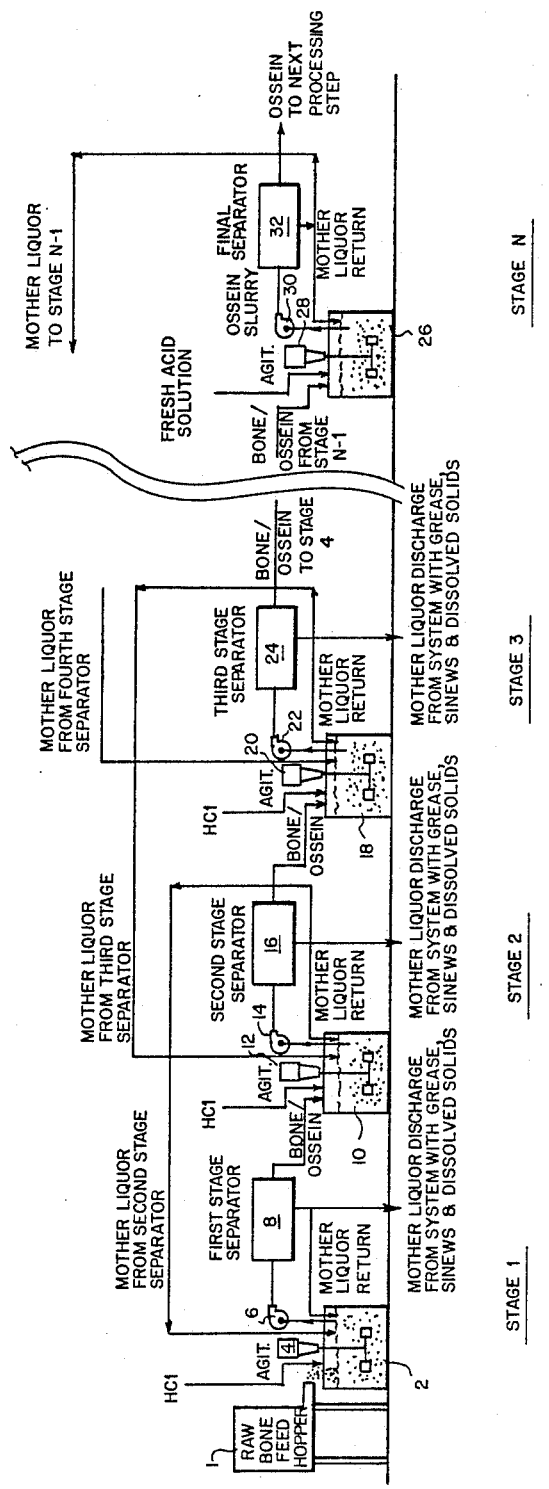
FIG. 1 is a schematic representation of a suspended particle acidulation process carried out in a series of stirred reaction/extraction vessels interspersed with separators.

As previously indicated herein, the invention is a novel leaching process which can be applied to the leaching of any of a very wide variety of solid particulate materials, and provides particular benefit where the solid particulate material is of a highly heterogeneous character, such as particles of widely varying size shape and density. The invention is described hereinafter with particular reference to the demineralization of bone to facilitate ease of description, but it should be understood that this is only one of many industrial processes in which the invention can be beneficially applied.

The propensity of solid particles to settle in a liquid medium and the effect of agitation of the medium on such settling are the fundamental aspects of particle behaviour of concern in this invention. This propensity, which can be characterized by reference to terminal settling velocity, is a function of particle size, aspect ratio or shape, and density. Particles of granulated bone typically exhibit the classical bell-shaped distribution curve of terminal settling velocities and it is by making use of this characteristic that the present invention achieves its success.

The process of this invention can be carried out in a wide variety of different ways, depending on the specific requirements of the particular system to which it is applied. For example, the process can be operated on a batch, semi-continuous or continuous basis, as desired. In some instances, the process is operable with only a single stage, but usually the requirements of commercial operation will dictate that a multi-stage process be used. In multi-stage processes, the flow can be co-current or counter-current, but under most circumstances, counter-current flow will be preferable. The equipment used can comprise a series of individual stirred vessels which function as extraction stages, or a vertical column which provides a series of compartments, each of which serves as an extraction stage. For details on the design of counter-current extraction processes, reference can be made, for example, to Plachco et al, "Counter-Current Solid Liquid Extraction in a Cascade of Batch Extractors", The Canadian Journal of Chemical Engineering, Vol. 50, 611–615, October, 1972; to Agarwal et al, "Multistage-Leaching Simulation", Chemical Engineering, 135–140, May 24, 1976; and to Schwartzberg, H. G., "Continuous Countercurrent Extraction in the Food Industry", *CEP* 76 No. 4, pages 67–85, 1980.

In the method of this invention, in each extraction zone agitation is provided and the degree of agitation employed is preferably sufficient to suspend all, or substantially all, of the particles. This is a very important aspect of the process. If there is too little agitation, the particles will settle to the bottom of the extraction zone, and no separation on the basis of propensity to settle will be possible. On the other hand, if there is too much agitation, the particles will all circulate about the extraction zone, regardless of their individual propensity to settle, and again, no separation on the basis of propensity to settle will be possible.

In preferred embodiments of the invention, baffles or obstructions are placed within the extraction stages to create zones which differ with respect to the velocity of fluid flow therein. Under such conditions, unsegregated particles moving between zones characterized by different fluid velocities will tend to segregate upon entering a zone of appropriate velocity.

In carrying out the process, the agitation needed to suspend the particles in the liquid solvent can be provided by any suitable means. For example, the agitation can be provided by a mechanical agitator such as a flat or axial turbine, a marine style propeller, or a closed pump impeller. Mechanical agitation would typically be used for any large scale commercial process. However, any form of agitation can be used which induces a consistent liquid flow which will dependably buoy particles according to their size and density. The level of agitation is not narrowly critical and, under ordinary circumstances, there is a considerable range over which successful operation can be achieved. Under appropriate circumstances, the agitation can be provided by sparging with air or other gaseous medium and agitation by use of a gaseous medium will be beneficial for processes in which the gas promotes required chemical reaction or propensity for separation. Agitation by means of a gaseous medium can be used alone or in conjunction with and as a supplement to mechanical agitation.

In the process of demineralizing bone with hydrochloric acid, the particle density typically ranges from about 1.0 gm/cc to about 2.1 gm/cc with an average of about 1.7 gm/cc. The density distribution varies somewhat with the origin of the bone. The acid solution typically has a density of between about 1.04 and about 1.08 gm/cc depending on the concentration of extracted minerals present therein. Thus, there is a substantial difference in density between the bone particles and the liquid solvent in which they are suspended. The mineral species which are extracted are calcium phosphate, calcium carbonate and compounds of sodium, potassium and magnesium. The bone particles which serve as starting material for the process typically range from about 2 to about 30 millimeters in diameter. Completion of the demineralization process yields particles of ossein which will be similar in size and shape to the original bone particles. In contrast with the average density of about 1.7 gm/cc for bone particles, ossein has an average density of about 1.05 gm/cc. These physical characteristics of granulated bone, concentrated hydrochloric acid, and ossein largely establish the specific design criteria for the apparatus used to bring about the contact required to accomplish the leaching operation. Other solids and liquids of widely differing character will require the design of apparatus which may be significantly different in order to provide optimum operation, but which nonetheless incorporates the same inventive concepts.

Granulated bone is a material that is highly heterogeneous in character. Thus, for example, the particle shape can vary from almost spherical, to plate-like, to sliver-like. Moreover, the density, hardness, and porosity can all vary substantially. Accordingly, the process of this invention is especially beneficial when applied to the demineralization of granulated bone, because of its ability to provide uniformity of treatment in spite of the heterogeneity of the starting material.

To quantify shape distribution of bone particles, it is convenient to characterize the bone in terms of aspect ratios. For example, the longest dimension of the particle is defined as the length, the middle dimension as the width, and the shortest dimension as the depth. Aspect ratios between the length, width and depth dimensions can be calculated, and particle shapes characterized by reference to aspect ratio. If all the dimensions are similar, then the particle can be described as a "spheroid" (this term being used to include spheres, prolate spheroids and oblate spheroids). If the depth and width dimension are the same and much less than the length dimension, then the particle can be described as a "cylindroid". If the ratios between depth and width and depth and length are much smaller than unity, then the particle can be described as a "slab" and, if these ratios are even smaller, as a "flake". Thus, as a representative classification, the term spheroid could be employed where the ratio of width:depth:length equals 1:1:1 to 1:0.7:0.7; the term cylindroid where the ratio depth:- width equals 1:1 to 1:0.7 and the ratio width:length is less than 0.7; the term slab where the ratio depth:width equals 1:0.7 to 1:0.3; and the term flake where the ratio depth:width is less than 0.3.

Demineralization of bone is an example of a process in which the extractable portion of the solid material is more dense than the non-extractable portion. Thus, the greater the degree to which extraction takes place, the more buoyant the particle becomes, since the ratio of the particle's exterior surface area to mass increases as the extractable material is removed. In other words, extraction decreases the propensity of the particle to settle.

In the process of this invention, the agitators are designed to promote suspension of all, or nearly all, of the particles in the extraction zone, but are restrained either in speed or size, or by the presence of baffles or obstructions, from the capability of suspending all particles uniformly throughout the extraction zone without regard to individual propensity to settle. Therefore, particles with less propensity to settle will have a tendency to drift into and occupy certain portions of the extraction zone, whereas particles having a greater propensity to settle will drift short of these areas. The particles with the least propensity to settle would, for example, be most capable of being suspended in an upper region of the extraction zone or a region where the upward velocity of the liquid solvent is lowest. Conversely, the particles with the greatest propensity to settle would be relatively incapable of remaining suspended in that region. It follows that a slurry withdrawn from such a region would contain a higher concentration of particles of a low propensity to settle than the concentration of such particles averaged over the entire extraction zone. From this it also follows that by withdrawing slurry from such a region one can selectively remove particles of a low propensity to settle while leaving behind particles with a high propensity to settle. The particles remaining in the extraction zone would continue to lose dense material as a result of the extraction. Eventually, all particles fed into the extraction zone would reach the withdrawal point. However, particles which inherently have less propensity to settle, or are caused to have less propensity to settle by the extracting action of the solvent, would have a tendency to be withdrawn more quickly and thereby occupy the extraction zone for a shorter time than particles which inherently have a greater tendency to settle, or that tend to resist the action of the solvent. In summary, dense bone will tend to remain longer in the extraction zone, and be subjected to a more protracted acidulation before it is withdrawn. Less dense and/or porous bone, which has a tendency to demineralize more quickly will have a congruent tendency to pass more quickly through the process and thereby avoid an excessively protracted acidulation. Similarly, large diameter particles, which have a lower exterior surface area to mass ratio than smaller diameter particles of equal density and consequently a greater propensity to settle, will tend to remain longer and thereby receive the more protracted acidulation which they require. Conversely, small particles, which have less propensity to settle in an agitated liquid medium, will tend to receive the less protracted acidulation which is appropriate for them.

As previously explained, the propensity of particles to settle in an agitated liquid medium is a function of size, aspect ratio or shape, and density. In an agitated liquid, a plate-shaped object will settle more slowly, perhaps in an erratic fashion, than a spheroid of the same weight and bulk density. A plate-shaped bone particle will react more quickly with hydrochloric acid than a spherical bone particle of the same weight and density. Therefore, the lower settling velocity of the plate-shaped object is an asset, in the context of this invention, because it allows the process to convey more rapidly the very particle which will react more rapidly.

In the process of demineralizing bone, the extractable portion of the bone particle is more dense than the non-extractable portion. As a consequence, buoyancy increases as extraction proceeds, and the process operates by withdrawing the relatively more buoyant particles in each stage. Typically, these relatively more buoyant particles will be withdrawn from a region near the upper part of the stage, as that is where they will tend to collect. However, it should be noted that they can be withdrawn from any point within the stage where they tend to concentrate, and such point will depend upon the design of the specific apparatus used in conducting the process.

While acid extraction of bone particles results in increased buoyancy, and thus facilitates the use of a process in which particles are fed to the bottom of a stage and withdrawn from the top of the stage,—or in a multistage column are fed to the bottom of a lowermost stage and withdrawn from the top of an uppermost stage—the process of this invention is, of course, not limited to use under such circumstances. Thus, for example, segregation and separation of particles can be effected not on the basis of lighter particles rising, but on the basis of heavier particles falling, and the selective withdrawal can then be near the bottom of each stage rather than near the top. This technique would be especially applicable where the extractable portion of the solid particle is less dense than the non-extractable portion.

The relative densities of the solid material to be leached and the liquid solvent are not critical in the present invention. In leaching processes, the solid material typically has a much higher density than the liquid solvent, and such substantial density difference facilitates the effective operation of the process of this invention.

The term "solvent" is used herein to refer to any medium which functions to extract material from the particulate solid whether the action of the solvent is physical or both chemical and physical in nature.

The residence time that the particles spend in a particular extraction stage is dependent upon various factors such as throughput rate, volume of the stage, and the design of the equipment. It is a matter of design choice, and can be varied widely. It is only necessary to maintain contact between the liquid solvent and the particulate solid material for a time sufficient to leach extractable material from the solid. The total time required to complete the demineralization is dependent on numerous factors including the size and density of the bone particle, the acid concentration, and the temperature at which the process is carried out.

Any means by which particles can be selectively withdrawn from the process is intended to be within the scope of the present invention. By "selective withdrawal" is meant withdrawal in accordance with some predetermined characteristic, for example, withdrawal from an extraction stage of particles which are more buoyant than the average for that stage or less buoyant than the average for that stage.

It should be kept in mind that the process of this invention is clearly distinct from a conventional stirred-tank process—as well as being distinct from a conventional settled-bed process. In a conventional stirred-tank process, there is no intention to segregate particles according to buoyancy, nor is segregation of particles practical since the contents of the tank are usually well-mixed, and thus selective withdrawal of particles is not possible.

It will be understood that a single stage process, i.e., a single compartment, may, in many instances, not be selective enough to achieve the desired degree of process uniformity. By chance, a significant number of particles may be captured and removed before they have been sufficiently processed and many particles may remain too long. Also fluid velocity regimes are often unstable and may periodically disrupt—resulting in temporary dislocation of particle populations, e.g., less buoyant particles may temporarily surge to the top of a vessel. To counter these difficulties, in most cases, it is desirable to divide the process among a plurality of stages. The number of stages depends on the nature of the chemical/physical changes experienced by the particles and the configuration and size of the processing equipment, but as many as fifty may be appropriate in some cases. Partially processed particles from the first stage are fed to the second. The second stage is similar to the first in that it also consists of an agitated compartment with means to selectively remove certain particles in preference to others, for example to selectively remove more buoyant particles in preference to less buoyant. The second stage may differ in size, degree and type of agitation, and exact location and design of means for selective withdrawal. For example, as the particles are generally less dense than those in the first stage, a less vigorous agitation may be required to produce the non-uniform suspension needed to provide regions with preferential buoyant particle concentration. Third and subsequent stages may be similarly provided.

An important factor in determining whether a multi-stage process is needed is whether there is overlap between the terminal velocity distribution of the bone particles and the terminal velocity distribution of ossein. This is dependent on the source of the bone, and where such overlap exists multiple stages will generally be needed to obtain adequate separation.

The wide range in density of bone particles present in typical feedstocks evidences the importance of multi-stage design. Thus, for example, very light bone particles would be conveyed from a single stage system before they are completely acidulated. The multi-stage configuration imposes a minimum residence time on all particles.

A preferred embodiment of the invention employs a counterflow of acid liquor, that is, acid liquor leaving the process is withdrawn principally from the first stage compartment whereas processed solid particles leaving the process as ossein are withdrawn from the last stage. Fresh acid or other liquid solvent can be added to any stage. Counterflow is achieved by separating the liquor from the particle slurry withdrawn from the first stage or from any stream of particle slurry which is withdrawn from and then recycled to the first stage. Further, it is advantageous to return the liquor separated from the ossein product slurry to the final stage. In addition, means are typically provided to transfer any excess of liquor which may accumulate in any stage following the first to the preceeding stage. The purpose of this counterflow is to separate fine degradable particles, grease, and soluble contaminants from the product ossein.

FIG. 1 illustrates a particular embodiment of the process of this invention in which leaching is carried out in a series of stirred vessels interspersed with separators. As shown in the drawing, granulated bone from hopper 1 and concentrated hydrochloric acid are fed to first stage tank 2, which is equipped with agitator 4, and a particle slurry is drawn off from the upper portion of tank 2 by pump 6 and pumped to first stage separator 8, which separates out most of the liquor (sometimes referred to as "mother liquor") and splits it between a recycle stream that is directed to tank 2 and a process effluent stream containing grease, sinews, and dissolved solids. Partially demineralized bone (referred to in FIG. 1 as bone/ossein) is directed from first stage separator 8 to second stage tank 10, and particle slurry is drawn off from near the top of tank 10 by pump 14 and pumped to second stage separator 16. Each combination of tank and separator constituting an extraction stage functions in a similar manner with liquor from the second stage separator 16 being partially recycled to first stage tank 2 and partially recycled to second stage tank 10, liquor from the third stage separator 24 being partially recycled to second stage tank 10 and partially recycled to third stage tank 18, and so forth.

The process illustrated in FIG. 1 is shown as being constituted of "N" stages, with the product from the "N" stage separator 32 being ossein, i.e., bone that has been completely demineralized. The ossein is thereafter subjected to washing and liming steps as are conventionally employed in the gelatin manufacturing process.

Figure 2:
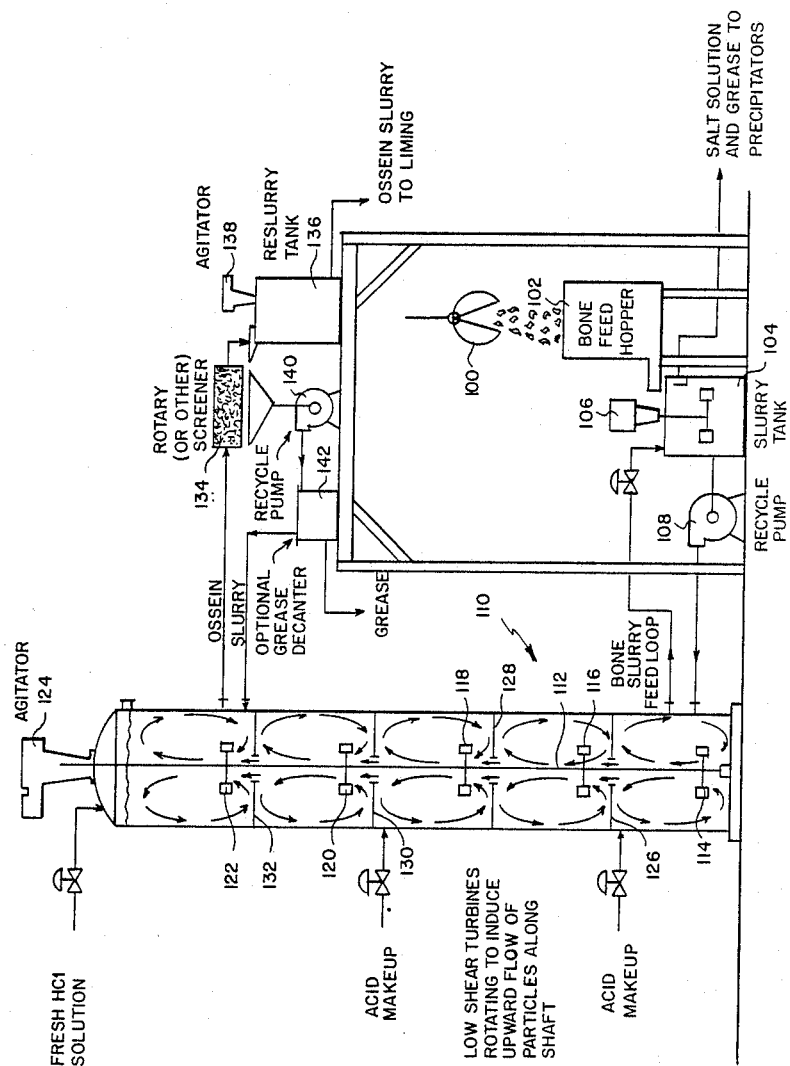
FIG. 2 is a schematic representation of a countercurrent suspended particle acidulation process carried out in a vertical reaction/extraction column.

An alternative embodiment of the process of this invention is illustrated in FIG. 2. In this embodiment, leaching is carried out in a vertical column comprised of a series of five vertically juxtaposed compartments. As shown in the drawing, granulated bone is discharged from power shovel 100 to hopper 102, which feeds it to slurry tank 104. The slurry in tank 104 is kept in constant motion by agitator 106 and pumped by recycle pump 108 to the bottom of extraction column 110, with a portion of the slurry being recycled back to tank 104. Acid liquor containing grease and salts is withdrawn from tank 104 by a separations device (not shown) and sent to precipitators (not shown) for the recovery of dissolved salts. Extraction column 110 is equipped with a single centrally located agitator shaft 112 which passes through all five compartments and supplies rotational power to low shear turbines 114, 116, 118, 120 and 122 that furnish agitation to the respective stages of the column. Shaft 112 is driven by agitator 124, and passes through openings in partitions 126, 128, 130 and 132, each of which separates adjacent compartments. The agitation in each compartment is designed to impell the more buoyant particles through the opening in the partition separating this compartment from the compartment above it. Each partition is also designed to allow the simultaneous downflow of liquor. This can be achieved by constructing the partition from screen or perforated plate material which will allow liquid to pass, but will substantially block solid particles. It can also be achieved by the use of baffles which do not completely interdict downflow of liquid, but tend to block the preferred downflow paths of solid particles (particularly buoyant particles).

Fresh hydrochloric acid solution is fed to the top of column 110 and to intermediate stages, as acid makeup, as required to maintain proper acid concentration. Ossein particles are withdrawn from the upper stage of column 110 by a rotary screener 134, or other separations device, are reslurried in tank 136 by means of agitator 138 and then pumped to the liming step of the gelatin manufacturing process. Liquor from the rotary screener 134 is pumped by recycle pump 140 to grease decanter 142, and recycled back to the upper stage of column 110.

Many variations in the process described in FIG. 2 are possible, and can be utilized if desired. For example, raw bone particle slurry can be fed to a stage of the column other than the first stage; product slurry can be withdrawn from a stage other than the last stage; slurry bypass lines can be employed to pump slurry between stages that are not physically adjacent; and partitions can be designed to allow the least buoyant particles in a compartment to fall through to the compartment below with the downflowing liquor, as this will enhance the separation in the column between more buoyant and less buoyant particles.

Introduction of bone particles to one or more intermediate stages of the column can be especially beneficial. Thus, for example, less buoyant particles can first descend to lower stages of the column and then, as extraction proceeds and they are rendered more buoyant, they can rise and make their way toward the top of the column. In this way, the total residence time within the column is increased for less buoyant particles as compared with more buoyant particles, as is desired.

Bone particles can be introduced only to the first stage, to a single intermediate stage, to two or more intermediate stages, or to the first stage and to one or more intermediate stages, with the choice being determined primarily by the character of the particular bone particles being processed. For example, where the bone particles being processed have densities extending over a broad range, introduction to an intermediate stage is beneficial to provide increased total residence time for the most dense particles and reduced total residence time for the least dense particles.

Figure 3:
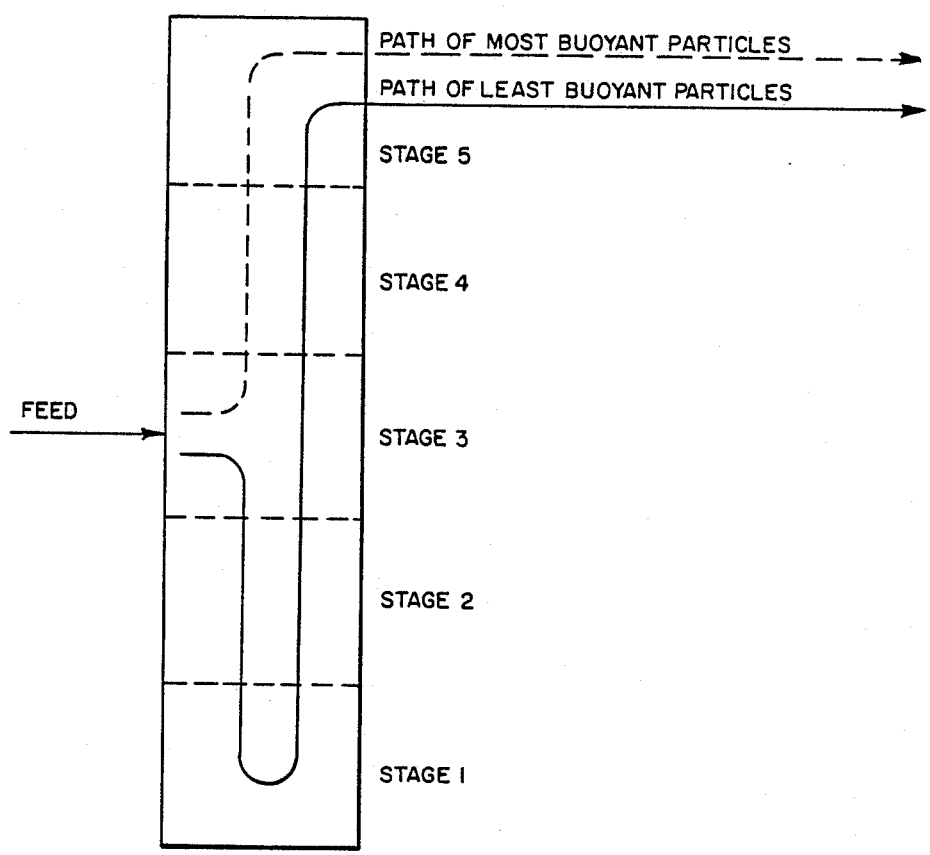
FIG. 3 is a schematic illustration of a five-stage vertical reaction/extraction column, useful in the process of FIG. 2, in which the feed is directed to an intermediate stage.

FIG. 3 illustrates a five stage column like that of FIG. 2, in which bone particles are fed to an intermediate stage, namely stage 3. As shown in FIG. 3, the flow path for the least buoyant particles is from stage 3 to stage 2 to stage 1, then back to stage 2 and then to stage 3, stage 4 and stage 5. In effect, stages 1, 2 and 3 are used twice in regard to these particles, since the particles traverse these stages in a downward course and then in an upward course. In contrast, the path of the most buoyant particles is from stage 3 to stage 4 to stage 5. Thus, the least buoyant particles are subject to a much greater residence time than the most buoyant particles, as is desired.

Figure 4:
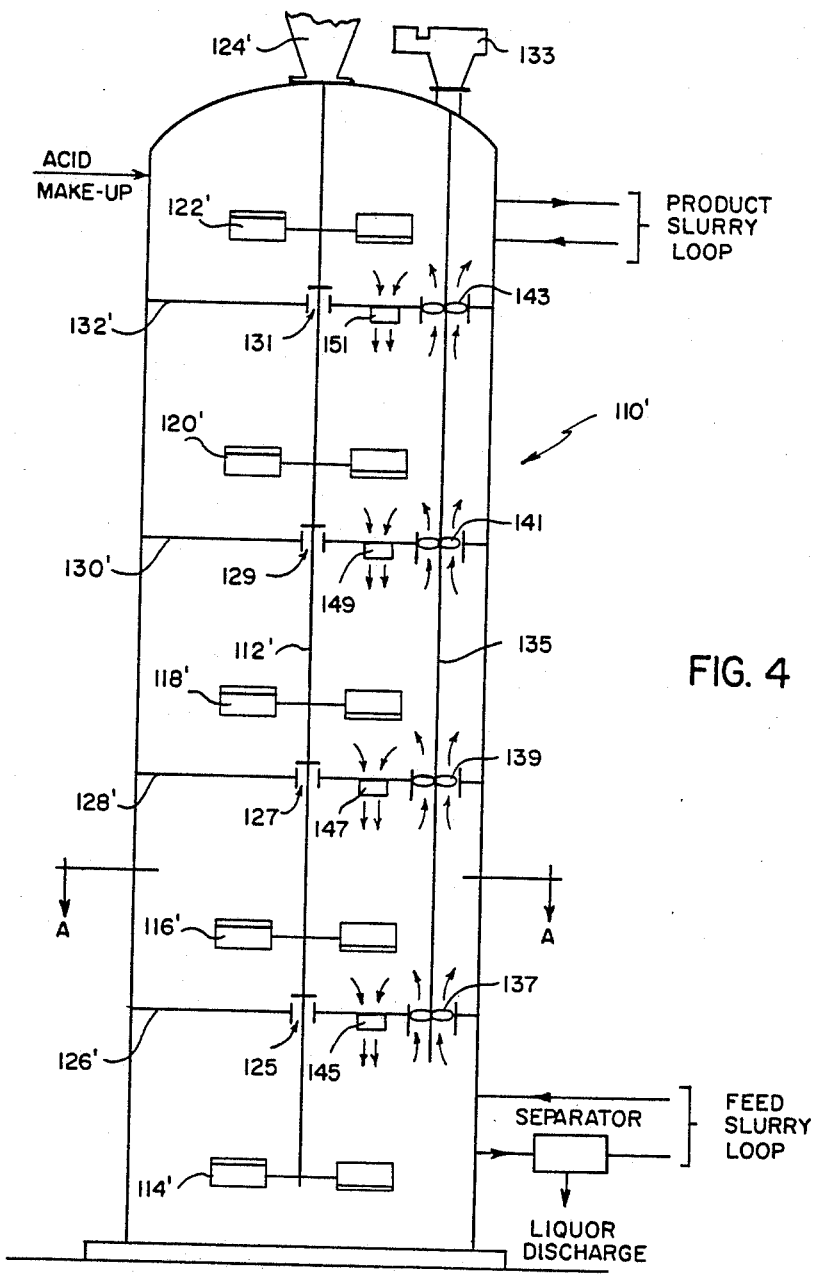
FIG. 4 is a schematic illustration of an alternative design for a five-stage vertical reaction/extraction column which is useful in the process of FIG. 2.

FIG. 4 illustrates an alternative design for the five-stage vertical reaction/extraction column shown in FIG. 2. As shown in FIG. 4, extraction column 110' is equipped with main agitator shaft 112' which is positioned off-center and passes through all five compartments of column 110'. Shaft 112', which provides rotational power to low shear turbines 114', 116', 118', 120' and 122', is driven by agitator 124' and passes through labyrinth seals 125, 127, 129 and 131 in partitions 126', 128', 130' and 132', each of which separates adjacent compartments. Variable speed drive motor 133 drives auxiliary shaft 135 which in turn drives propeller-style pump impellers 137, 139, 141, and 143 positioned, respectively, within partitions 126', 128', 130' and 132'. The low shear turbines provide agitation within each stage that is sufficient to maintain the particles in a state of suspension, while the pump impellers lift liquor containing the most buoyant particles between stages. Partitions 126', 128', 130' and 132' are equipped, respectively, with ports 145, 147, 149 and 151 through which liquor containing the least buoyant particles is able to pass to the stage below. In counterflow operation, the flow rate of liquor passing down through the ports exceeds the rate at which liquor is lifted by the pump impellers. Labyrinth seals 125, 127, 129 and 131 provide tortuous flow paths which severely restrict the flow of liquor, and thereby facilitate the desired control of the flow of liquor by the action of the ports and pump impellers.

Figure 5:
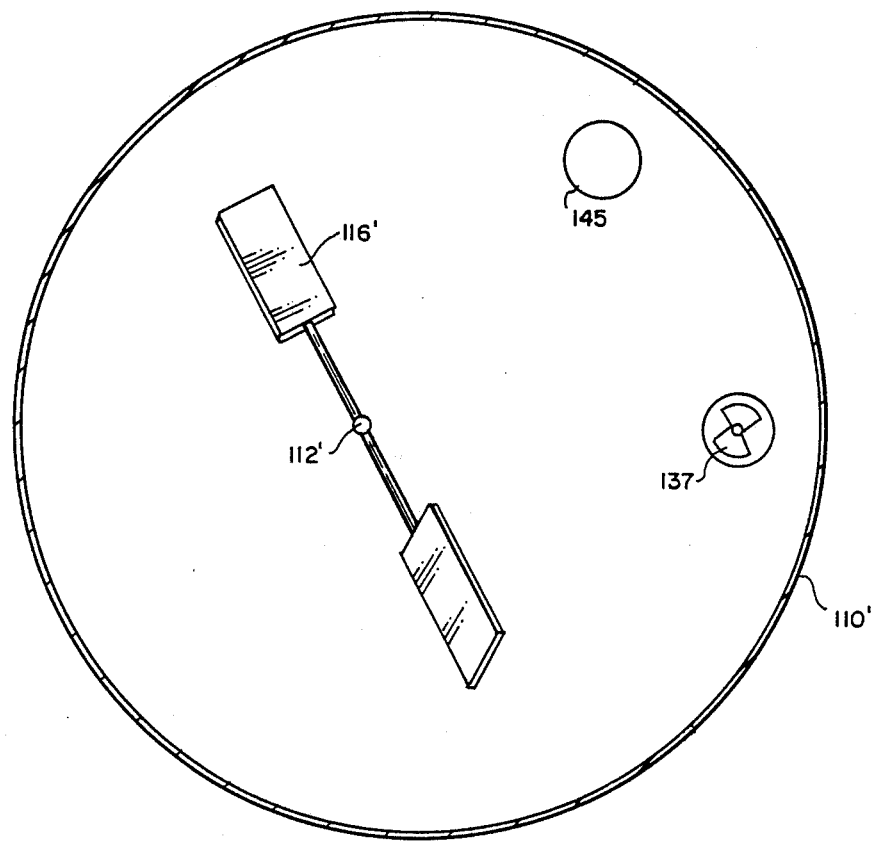
FIG. 5 is a sectional view taken on line A—A of FIG. 4.

As most clearly shown in FIG. 5, main agitator shaft 112' is mounted off-center and pump impeller 137 is spaced an appropriate distance from port 145 to provide a flow pattern which promotes the desired transfer of the most buoyant particles to the stage above and of the least buoyant particles to the stage below.

By the process of this invention, bone particles of varying size, shape, hardness and density can be acidulated more uniformly and more rapidly than by the conventional settled bed method. The process improves both the yield of gelatin and the uniformity and physical characteristics of the finished gelatin. It also more effectively separates contaminants from the ossein during the acidulation step, and this is easier and much more cost effective than prior art techniques in which contaminants are substantially separated after completion of the acidulation step. Unlike the prior art settled bed process, in which the solvent composition and duration of contact between particle and solvent is affected by the position of the particle in the bed, the particles are individually suspended in the solvent and all particles in a stage contact solvent of substantially the same composition. The process of this invention reduces the processing vessel volume and the overall processing time needed for acidulation of bone. It provides a process which is inherently more controllable with respect to the constituency and physical characteristics of the finished product.

In the present invention, large particles of dense bone are given the more protracted acidulation they require, while smaller particles of less dense bone are given the less protracted acidulation they require. This same principle is, of course, applicable to, and beneficial in, the leaching of many other solid products, particularly those of highly heterogeneous character, and the demineralization of bone is merely exemplary of the broad scope of the present invention.

The invention has been described in detail with particular reference to preferred embodiments thereof; but it will be understood that variations and modifications can be effected within the spirit and scope of the invention.

What is claimed is:

1. A leaching process for separating extractable material from a particulate solid material, said process comprising the steps of:
   (1) introducing said particulate solid material and a liquid solvent to an extraction zone,
   (2) subjecting said liquid solvent within said extraction zone to controlled agitation to suspend said particulate solid material therein and effect segregation of particles thereof in relation to their propensity to settle, (3) maintaining said liquid solvent in contact with said suspended particulate solid material within said extraction zone for a time sufficient to leach extractable material therefrom, and (4) selectively withdrawing, on the basis of said segregation, particles of said particulate solid material from said extraction zone.

2. A leaching process which is useful for leaching a particulate solid material comprising an extractable portion and a non-extractable portion, said extractable portion being of greater density than said non-extractable portion whereby extraction is accompanied by an increase in the buoyancy of said particulate solid material, said process comprising the steps of:

(1) introducing said particulate solid material and a liquid solvent to an extraction zone, (2) subjecting said liquid solvent within said extraction zone to controlled agitation to suspend said particulate solid material therein and effect segregation of particles thereof in relation to their propensity to settle, (3) maintaining said liquid solvent in contact with said suspended particulate solid material within said extraction zone for a time sufficient to leach extractable material therefrom, and (4) selectivley withdrawing, on the basis of said segregation, more buoyant particles of said particulate solid material from said extraction zone while leaving less buoyant particles within said extraction zone.

3. A leaching process which is useful for leaching a particulate solid material comprising an extractable portion and a non-extractable portion, said extractable portion being of lesser density than said non-extractable portion whereby extraction is accompanied by a decrease in the buoyancy of said particulate solid material, said process comprising the steps of:

(1) introducing said particulate solid material and a liquid solvent to an extraction zone, (2) subjecting said liquid solvent within said extraction zone to controlled agitation to suspend said particulate solid material therein and effect segregation of particles thereof in relation to their propensity to settle, (3) maintaining said liquid solvent in contact with said suspended particulate solid material within said extraction zone for a time sufficient to leach extractable material therefrom, and (4) selectively withrawing, on the basis of said segregation, less buoyant particles of said particulate solid material from said extraction zone while leaving more buoyant particles within said extraction zone.

4. A leaching process which is useful for leaching a particulate solid material comprising an extractable portion and a non-extractable portion, said process comprising the steps of:

(1) introducing said particulate solid material and a liquid solvent to at least one stage of a series of stages in each of which said particulate solid material is contacted with said liquid solvent, (2) subjecting said liquid solvent in each of said stages to controlled agitation to suspend said particulate solid material therein and effect segregation of particles thereof in relation to their propensity to settle, (3) maintaining said liquid solvent in contact with said suspended particulate solid mateiral within each of said stages for a time sufficient to leach extractable material therefrom, (4) selectively withdrawing, on the basis of said segregation, particles of said particulate solid material from each stage of said series except the final stage and introducing said particles to the next successive stage of said series, and (5) withdrawing from the final stage of said series particulate solid material from which substantially all of said extractable portion has been extracted.

5. A leaching process which is useful for leaching a particulate solid material comprising an extractable portion and a non-extractable portion, said extractable portion being of greater density than said non-extractable portion whereby extraction is accompanied by an increase in the buoyancy of said particulate solid material, said process comprising the steps of:

(1) introducing said particulate solid material and a liquid solvent to at least one stage of a series of stages in each of which said particulate solid material is contacted with said liquid solvent, (2) subjecting said liquid solvent in each of said stages to controlled agitation to suspend said particulate solid material therein and effect segregation of particles thereof in relation to their propensity to settle, (3) maintaining said liquid solvent in contact with said suspended particulate solid material within each of said stages for a time sufficient to leach extractable material therefrom, (4) selectively withdrawing, on the basis of said segregation, more buoyant particles of said particulate solid material from each stage of said series except the final stage while leaving less buoyant particles within such stage and introducing said more buoyant particles to the next successive stage of said series, and (5) withdrawing from the final stage of said series particulate solid material from which substantially all of said extractable portion has been extracted.

6. A leaching process which is useful for leaching a particulate solid material comprising an extractable portion and a non-extractable portion, said extractable portion being of lesser density than said non-extractable portion whereby extraction is accompanied by a decrease in the buoyancy of said particulate solid material, said process comprising the steps of:

(1) introducing said particulate solid material and a liquid solvent to at least one stage of a series of stages in each of which said particulate solid material is contacted with said liquid solvent, (2) subjecting said liquid solvent in each of said stages to controlled agitation to suspend said particulate solid material therein and effect segregation of particles thereof in relation to their propensity to settle, (3) maintaining said liquid solvent in contact with said suspended particulate solid material within each of said stages for a time sufficient to leach extractable material therefrom, (4) selectively withdrawing, on the basis of said segregation, less buoyant particles of said particulate solid material from each stage of said series except the final stage while leaving more buoyant particles within such stage and introducing said less buoyant particles to the next successive stage of said series, and (5) withdrawing from the final stage of said series particulate solid material from which substantially all of said extractable portion has been extracted.

7. A leaching process which is useful for leaching a particulate solid material that comprises extractable and non-extractable portions of different density, whereby extraction is accompanied by a change in the buoyancy of said particulate solid material, said process comprising the steps of:
   (1) introducing said particulate solid material and a liquid solvent to at least one stage of a series of stages in each of which said particulate solid material is contacted with said liquid solvent,
   (2) subjecting said liquid solvent in each of said stages to controlled agitation to suspend said particulate solid material therein and effect segregation of particles thereof in relation to their propensity to settle,
   (3) maintaining said liquid solvent in contact with said suspended particulate solid material within each of said stages for a time sufficient to leach extractable material therefrom,
   (4) selectively withdrawing, on the basis of said segregation, from each stage of said series except the final stage a slurry comprised of liquid solvent rich in either more buoyant or less buoyant particles of said particulate solid material and introducing said slurry to the next successive stage of said series,
   and (5) withdrawing from the final stage of said series particulate solid material from which substantially all of said extractable portion has been extracted.

8. A leaching process which is useful for leaching a particulate solid material comprising an extractable portion and a non-extractable portion, said extractable portion being of greater density than said non-extractable portion whereby extraction is accompanied by an increase in the buoyancy of said particulate solid material, said process comprising the steps of:
   (1) introducing said particulate solid material and a liquid solvent to at least one stage of a series of stages in each of which said particulate solid material is contacted with said liquid solvent,
   (2) subjecting said liquid solvent in each of said stages to controlled agitation to suspend said particulate solid material therein and effect segregation of particles thereof in relation to their propensity to settle,
   (3) maintaining said liquid solvent in contact with said suspended particulate solid material within each of said stages for a time sufficient to leach extractable material therefrom,
   (4) selectively withdrawing, on the basis of said segregation, from each stage of said series except the final stage a slurry comprised of liquid solvent rich in more buoyant particles of said particulate solid material and introducing said slurry to the next successive stage of said series,
   and (5) withdrawing from the final stage of said series a particulate solid material from which substantially all of said extractable portion has been extracted.

9. A leaching process which is useful for leaching a particulate solid material comprising an extractable portion and a non-extractable portion, said extractable portion being of lesser density than said non-extractable portion whereby extraction is accompanied by a decrease in the buoyancy of said particulate solid material, said process comprising the steps of:
   (1) introducing said particulate solid material and a liquid solvent to at least one stage of a series of stages in each of which said particulate solid material is contacted with said liquid solvent,
   (2) subjecting said liquid solvent in each of said stages to controlled agitation to suspend said particulate solid material therein and effect segregation of particles thereof in relation to their propensity to settle,
   (3) maintaining said liquid solvent in contact with said suspended particulate solid material within each of said stages for a time sufficient to leach extractable material therefrom,
   (4) selectively withdrawing, on the basis of said segregation, from each stage of said series except the final stage a slurry comprised of liquid solvent rich in less buoyant particles of said particulate solid material and introducing said slurry to the next successive stage of said series,
   and (5) withdrawing from the final stage of said series particulate solid material from which substantially all of said extractable portion has been extracted.

10. A process for the demineralization of bone in which particles of bone are leached with an acid solution to extract mineral material and yield particles of ossein similar in size and shape to said bone particles, said mineral material being of greater density than said ossein whereby said extraction is accompanied by an increase in the buoyancy of said bone particles, said process comprising the steps of:
    (1) introducing said bone particles and said acid solution to at least one stage of a series of stages in each of which said bone particles are contacted with said acid solution to extract said mineral material,
    (2) subjecting said acid solution in each of said stages to controlled agitation to suspend said bone particles therein and effect segregation thereof in relation to their propensity to settle,
    (3) maintaining said acid solution in contact with said suspended bone particles within each of said stages for a time sufficient to leach mineral material therefrom,
    (4) selectively withdrawing, on the basis of said segregation, more buoyant bone particles from each stage of said series except the final stage while leaving less buoyant bone particles within such stage and introducing said more buoyant bone particles to the next successive stage of said series,
    and (5) withdrawing from the final stage of said series particles which are substantially free of said mineral material and composed essentially of ossein.

11. A process as claimed in claim 1 wherein said particulate solid material is granulated bone and said liquid solvent is hydrochloric acid.

12. A process as claimed in claim 4 wherein said process is operated in a counter-current manner.

13. A process as claimed in claim 4 wherein said agitation is provided by mechanical impellers positioned within each stage.

14. A process as claimed in claim 4 wherein each of said stages comprises a stirred vessel.

15. A process as claimed in claim 4 wherein each of said stages is a compartment of a vertical multi-compartment column.

16. A process as claimed in claim 5 wherein less buoyant particles pass from each stage of said series except the first stage to the immediately preceeding stage.

17. A process as claimed in claim 7 wherein pump means are associated with each said stage to effect said slurry withdrawal.

18. A process as claimed in claim 10 wherein said acid is hydrochloric acid.

19. A process as claimed in claim 10 wherein said bone particles have a size in the range of from about 2 to about 30 millimeters.

20. A process for the demineralization of bone in which particles of bone are leached with an acid solution to extract mineral material and yield particles of ossein similar in size and shape to said bone particles, said mineral material being of greater density than said ossein whereby said extraction is accompanied by an increase in the buoyancy of said bone particles, said process comprising the steps of:
  (1) introducing said bone particles and said acid solution to the lowermost and uppermost compartments, respectively, of a vertical multi-compartment extraction column,
  (2) subjecting said acid solution in each of said compartments to controlled agitation to suspend said bone particles therein and effect segregation thereof in relation to their propensity to settle,
  (3) maintaining said acid solution in contact with said suspended bone particles within each of said compartments for a time sufficient to leach mineral therefrom,
  (4) passing acid solution from each said compartment except the lowermost compartment to the compartment below,
  (5) selectively withdrawing, on the basis of said segregation, more buoyant bone particles from each said compartment except the uppermost compartment and introducing said more buoyant bone particles to the next higher compartment,
  and (6) withdrawing from the uppermost compartment particles which are substantially free of said mineral material and composed essentially of ossein.

21. A process as claimed in claim 20 wherein agitation is provided in each of said compartments by a low shear turbine that is rotationally powered by a common shaft extending the length of said column.

22. A process as claimed in claim 20 wherein each compartment is separated from the adjacent compartment by a partition which permits the passage of said acid solution but substantially blocks the passage of said bone particles except for the passage of said more buoyant particles through an opening in said partition.

23. A process as claimed in claim 20 wherein bone particles are pumped as a slurry in said acid solution to said lowermost compartment and ossein particles are pumped as a slurry in said acid solution from said uppermost compartment.

24. A process as claimed in claim 20 wherein some of the less buoyant particles in each compartment pass with the acid solution to the compartment below so as to enhance the separation in the column between more buoyant and less buoyant particles.

* * * * *